United States Patent
Rife (10) Patent No.: US 10,967,975 B2
(45) Date of Patent: Apr. 6, 2021

(54) SEAT SYSTEM

(71) Applicant: TIMCO AVIATION SERVICES, INC., Greensboro, NC (US)

(72) Inventor: Mitchell R. Rife, Greensboro, NC (US)

(73) Assignee: HAECO Americas, LLC, Greensboro, NC (US)

( * ) Notice: Subject to any disclaimer, the term of this patent is extended or adjusted under 35 U.S.C. 154(b) by 0 days.

(21) Appl. No.: 16/309,383

(22) PCT Filed: Jun. 6, 2017

(86) PCT No.: PCT/US2017/036143
§ 371 (c)(1),
(2) Date: Dec. 12, 2018

(87) PCT Pub. No.: WO2017/218240
PCT Pub. Date: Dec. 21, 2017

(65) Prior Publication Data
US 2019/0263526 A1    Aug. 29, 2019

Related U.S. Application Data

(60) Provisional application No. 62/349,684, filed on Jun. 14, 2016.

(51) Int. Cl.
*B64D 11/06* (2006.01)
*B60N 2/427* (2006.01)
(Continued)

(52) U.S. Cl.
CPC ........... *B64D 11/0619* (2014.12); *B60N 2/22* (2013.01); *B60N 2/4214* (2013.01);
(Continued)

(58) Field of Classification Search
CPC ............. B64D 11/0619; B60N 2/4228; B60N 2/42709; B60N 2/4221
See application file for complete search history.

(56) References Cited

U.S. PATENT DOCUMENTS 4,394,047 A    7/1983    Brunelle ................. 297/361
4,511,178 A    4/1985    Brennan ................. 297/146
(Continued)

FOREIGN PATENT DOCUMENTS

WO    WO 2009/091300 A1    7/2009 ........... B60N 2/427

Primary Examiner — Timothy J Brindley
(74) Attorney, Agent, or Firm — MacCord Mason PLLC (57) ABSTRACT

A seat system for a passenger aircraft. The seat system includes a passenger seat frame having a backrest support assembly and a seat bottom support assembly. A quadrant assembly is connected between the backrest support assembly and the seat bottom support assembly. The quadrant assembly includes a quadrant member including a pivot point adapted to pivot the backrest with respect to the seat bottom support assembly and the quadrant member. The quadrant member is attached to the backrest and adapted to break away in the event of an impact with the backrest. The quadrant assembly may further include a pivot point brake assembly attached to the pivot point and adapted to provide a controlled stop of the backrest in the event of an impact with the backrest. In addition, a seat back tray table may be attached to the back of the passenger seat frame.

55 Claims, 8 Drawing Sheets

(51) Int. Cl.
  *B64D 11/00* (2006.01)
  *B60N 2/22* (2006.01)
  *B60N 2/42* (2006.01)
(52) U.S. Cl.
  CPC .... *B60N 2/42709* (2013.01); *B64D 11/00151* (2014.12); *B64D 11/064* (2014.12); *B64D 11/0638* (2014.12); *B64D 11/0642* (2014.12)

(56) References Cited

U.S. PATENT DOCUMENTS

| | | | |
|---|---|---|---|
| 5,320,308 A | 6/1994 | Bilezikjian et al. | 244/122 |
| 5,540,483 A | 7/1996 | Marechal | 297/440.15 |
| 5,676,421 A * | 10/1997 | Brodsky | B60N 2/4214 |
| | | | 297/216.13 |
| 6,478,256 B1 * | 11/2002 | Williamson | B64D 11/0619 |
| | | | 244/122 R |
| 8,777,308 B2 * | 7/2014 | Lee | B60N 2/4228 |
| | | | 297/216.14 |
| 2004/0007910 A1 | 1/2004 | Skelly | 297/406 |
| 2012/0139303 A1 | 6/2012 | Westerink et al. | 297/163 |
| 2013/0049416 A1 | 2/2013 | Funke et al. | 297/216.13 |
| 2014/0070578 A1 * | 3/2014 | Szelagowski | B60N 2/4221 |
| | | | 297/216.13 |
| 2016/0001886 A1 | 1/2016 | Fullerton | 11/647 |
| 2017/0121802 A1 * | 5/2017 | Kamat | B64D 11/06 |
| 2018/0264979 A1 * | 9/2018 | Lasell | B60N 2/688 |
| 2019/0031352 A1 * | 1/2019 | Pierson-Moonan | |
| | | | B60N 2/42781 |

* cited by examiner

SEAT SYSTEM

This application is the US National Stage filing if International Application No. PCT/US17/36143 filed Jun. 6, 2017, which claims the benefit of U.S. Provisional Application No. 62/349,684 filed Jun. 14, 2016, and is incorporated herein by reference in its entirety.

BACKGROUND OF THE INVENTIONS

(1) Field

The present inventions relates generally to seat systems for passenger vehicles and, more particularly, to a seat system for a passenger aircraft.

(2) Related Art

The present inventions relate to vehicle seats and, especially to seats of the type generally used in aircraft which have a reclinable backrest and which must also be capable of being pivoted forwardly to a "break-over" position when a substantial forward force is applied to the back of the seat near its top. The "break-over" position helps protect the seat cushions during cleaning and servicing operations and also helps to protect a passenger seated immediately rearwardly in a crash situation. One example of a seat including a quadrant assembly for providing forward tilting to a backrest is disclosed by Brunelle (U.S. Pat. No. 4,394,047) and is hereby incorporated by reference in its entirety.

One issue in the art has been the inability to reliably adjust quadrant support assemblies to tilt a backrest forward at a specific force threshold. Fine-tuning the quadrant support can be an expensive and laborious task, since even slight modifications to a seat system require modification of the quadrant assembly. Moreover, passenger seats for aircrafts are required by law to undergo rigorous testing prior to safety approval.

Another limitation with current quadrant support systems is that they do not allow for a controlled stop as a backrest pivots forward. Once the initial threshold has passed and the backrest begins to pivot to a "break-over" position, there lacks a mechanism for controlling the rate at which the backrest tilts forward.

Thus, there remains a need for a seat system having an improved quadrant support adapted for precisely controlling the amount of force at which the backrest will pivot forward while, at the same time, the rate at which the backrest pivots forward following an event in which a substantial forward force is applied.

SUMMARY OF THE INVENTIONS

The present inventions are directed to a seat system for a passenger aircraft. The seat system includes a passenger seat frame having (i) a backrest support assembly including a backrest and a spreader and (ii) a seat bottom support assembly. A quadrant assembly is connected between the backrest support assembly and the seat bottom support assembly. The quadrant assembly includes a quadrant member including a pivot point adapted to pivot the backrest with respect to the spreader and the quadrant member, a lower attachment point attached to the seat bottom support assembly and an upper attachment point attached to the backrest and adapted to break away in the event of an impact with the backrest. The quadrant assembly may further include a pivot point brake assembly attached to the pivot point and adapted to provide a controlled stop of the rotation of the backrest about the pivot point in the event of an impact with the backrest. In addition, a seat back tray table may be attached to the back of the passenger seat frame.

In one embodiment, a second quadrant assembly is attached to the backrest support assembly and the seat bottom support assembly. The second quadrant assembly may be attached to a second spreader located on an opposing side of the passenger seat frame.

Also, the quadrant member may be comprised of aluminum alloy having its longitudinal grain direction substantially oriented in a pre-determined direction, such as along the length of the quadrant member thereby reducing the variation in breaking strength of the quadrant member.

The quadrant assembly further includes a mechanical fuse located at the upper attachment point. In one embodiment, the mechanical fuse comprises a breakout pin inserted into a hole along the upper attachment point. The load to set the mechanical fuse may be dependent on the thickness of the cross-section of a fuse wall located adjacent to the hole. In one embodiment, the load for the breakout pin to break away from the upper attachment point is between about 100 pounds and 300 pounds. In one preferred embodiment, the load for the breakout pin to break away from the upper attachment point is about 200 pounds and the thickness of the cross-section of the fuse wall is about $\frac{1}{6}$ inches.

The pivot point brake assembly may include a brake pin and a pivot point brake plate, wherein the brake pin is inserted through a hole in the quadrant member and through an opening in the pivot point brake plate. Also, the pivot point brake plate may overlap at least one side of the quadrant member. In one embodiment, the opening in the pivot point brake plate that the brake pin is inserted into is a slot in the pivot point brake plate overlapping the hole in the quadrant member. The slot of pivot point brake plate may further include a stop wall at an opposing end adapted to prevent the brake pin from further deforming the pivot point brake plate.

The brake pin and the slot in the pivot point brake plate are adapted to provide a controlled stop of the rotation of the backrest about the pivot point after the impact causes the upper attachment point of the quadrant member to break away. In one embodiment, the brake pin provides a controlled stop by deforming through the slot of the pivot point brake plate overlapping the hole. In one embodiment, the controlled stop of the rotation of the backrest about the pivot point is controlled by the thickness of the pivot point brake plate. In another embodiment, the controlled stop of the rotation of the backrest about the pivot point is controlled by the width of the slot in the pivot point brake plate. In one preferred embodiment, the pivot point brake assembly resists force up to about 300 pounds before the brake pin deforms through the slot of the pivot point brake plate.

The brake pin may include a head having a groove adapted to fit the width of the slot of the pivot point brake plate to maintain the position of the brake pin in the slot. In one embodiment, the groove in the head of the brake pin is chamfered.

The pivot point brake assembly may also comprise both a first brake pin and a second brake pin. In one embodiment, the second brake pin simultaneously resists an applied force with the first brake pin. The first brake pin may be inserted into a first slot on the pivot point brake plate and the second brake pin may be is inserted into a second slot on the pivot point brake plate. In one embodiment, the first slot is located above the second slot. The first brake pin and the second brake pin may also be opposed with respect to the pivot point.

The seat back tray table attached to the back of the passenger seat frame may be movable between a first storage position and a second deployed position. In one embodiment, a lock mechanism is attached to the back of the passenger seat frame for retaining the seat back tray table in a secured position.

In one embodiment, the passenger seat further includes a display attached to the back of the passenger seat. The display may be adjoined by the back of the passenger seat.

A backrest cushion may be attached to the backrest support assembly. The backrest support assembly may further include a headrest. In one embodiment, the headrest is adjustable to accommodate for the height of a passenger.

The passenger seat may further include an upholstered package. In addition, the passenger seat may further include a trim package.

Accordingly, one aspect of the present inventions is to provide a seat system for a passenger aircraft, the seat system including (a) a passenger seat frame having (i) a backrest support assembly including a backrest and a spreader and (ii) a seat bottom support assembly; and (b) a quadrant assembly connected between the backrest support assembly and the seat bottom support assembly comprising a quadrant member including (i) a pivot point adapted to pivot the backrest with respect to the spreader and the quadrant member (ii) a lower attachment point attached to the seat bottom support assembly and (iii) an upper attachment point attached to the backrest and adapted to break away in the event of an impact with the backrest.

Another aspect of the present inventions is to provide in a seat system for a passenger aircraft wherein the seat system includes a passenger seat frame having (i) a backrest support assembly including a backrest and a spreader and (ii) a seat bottom support assembly, the improvement comprising a quadrant assembly, the quadrant assembly comprising: (a) a quadrant member connected between the backrest support assembly and the seat bottom support assembly including (i) a pivot point adapted to pivot the backrest with respect to the spreader and the quadrant member (ii) a lower attachment point attached to the seat bottom support assembly and (iii) an upper attachment point attached to the backrest and adapted to break away in the event of an impact with the seat back; and (b) a pivot point brake assembly attached to the pivot point and adapted to provide a controlled stop of the rotation of the backrest about the pivot point in the event of an impact with the backrest.

Still another aspect of the present inventions is to provide a seat system for a passenger aircraft, the seat system including (a) a passenger seat frame having (i) a backrest support assembly including a backrest and a spreader and (ii) a seat bottom support assembly; (b) a quadrant assembly connected between the backrest support assembly and the seat bottom support assembly comprising (i) a quadrant member including a pivot point adapted to pivot the backrest with respect to the spreader and the quadrant member, a lower attachment point attached to the seat bottom support assembly and an upper attachment point attached to the backrest and adapted to break away in the event of an impact with the backrest; and (ii) a pivot point brake assembly attached to the pivot point and adapted to provide a controlled stop of the rotation of the backrest about the pivot point in the event of an impact with the backrest; and (c) a seat back tray table attached to the back of the passenger seat frame.

These and other aspects of the present inventions will become apparent to those skilled in the art after a reading of the following description of the preferred embodiment when considered with the drawings.

DESCRIPTION OF THE EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
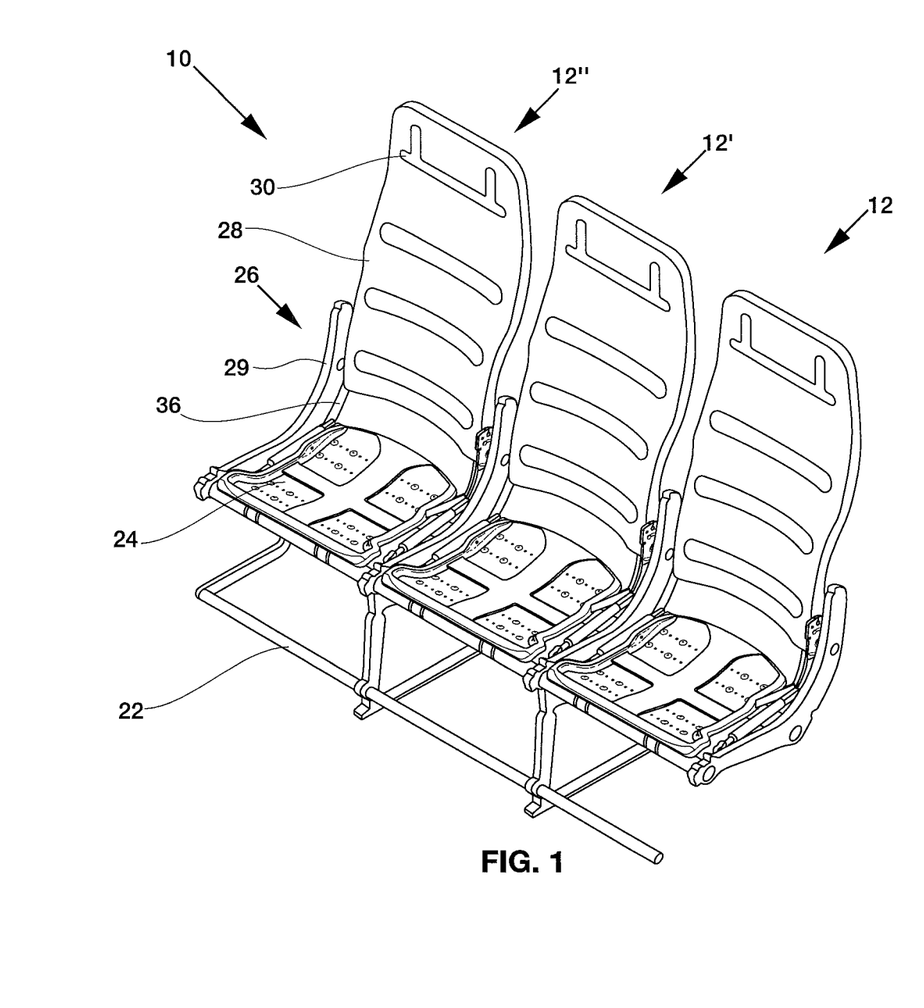
FIG. 1 is an overhead perspective view of one embodiment of a seat system constructed according to the present inventions.

Referring now to the drawings in general and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12.

Each of the passenger seats 12 may include a base frame 22, a seat bottom support assembly 24 attached to a base frame and a backrest support assembly 26 attached to the base frame 22 adjoining the seat component 24. The backrest support assembly 26 may further include a headrest 30. In one embodiment headrest 30 is adjustable to accommodate the height of a passenger. The backrest support assembly 26 includes a backrest 28 that may tilt with respect to spreader 29 by pivoting along quadrant assembly 36.

Figure 2:
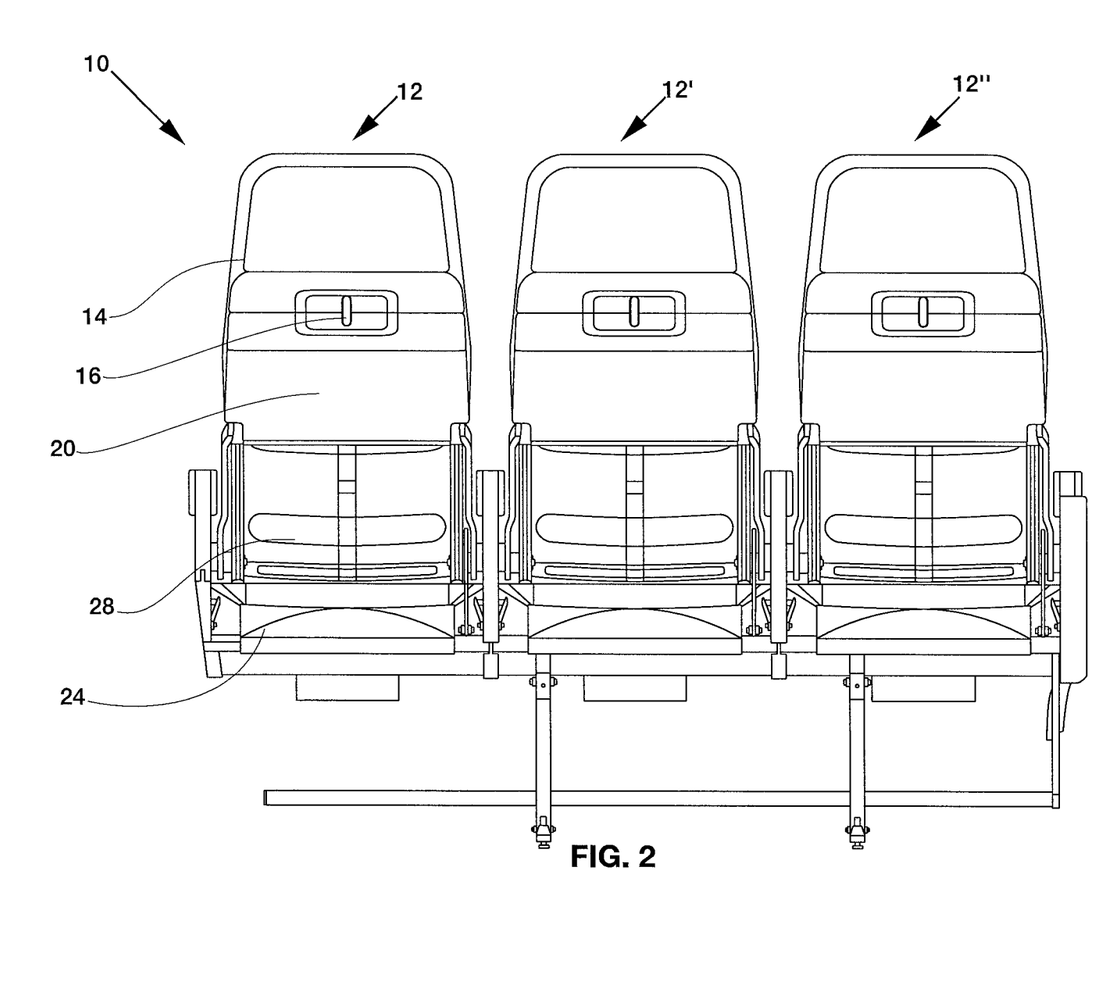
FIG. 2 is a rear elevational view of one embodiment of a seat system constructed according to the present inventions.

Turning to FIG. 2, there is shown a rear view of the seat system 10 constructed according to the present inventions. A seat back bezel 14 is attached to the back of the passenger seat 12. The seat back bezel 14 may adjoin a seat back tray table 20 attached to the back of passenger seat 12.

Figure 3:
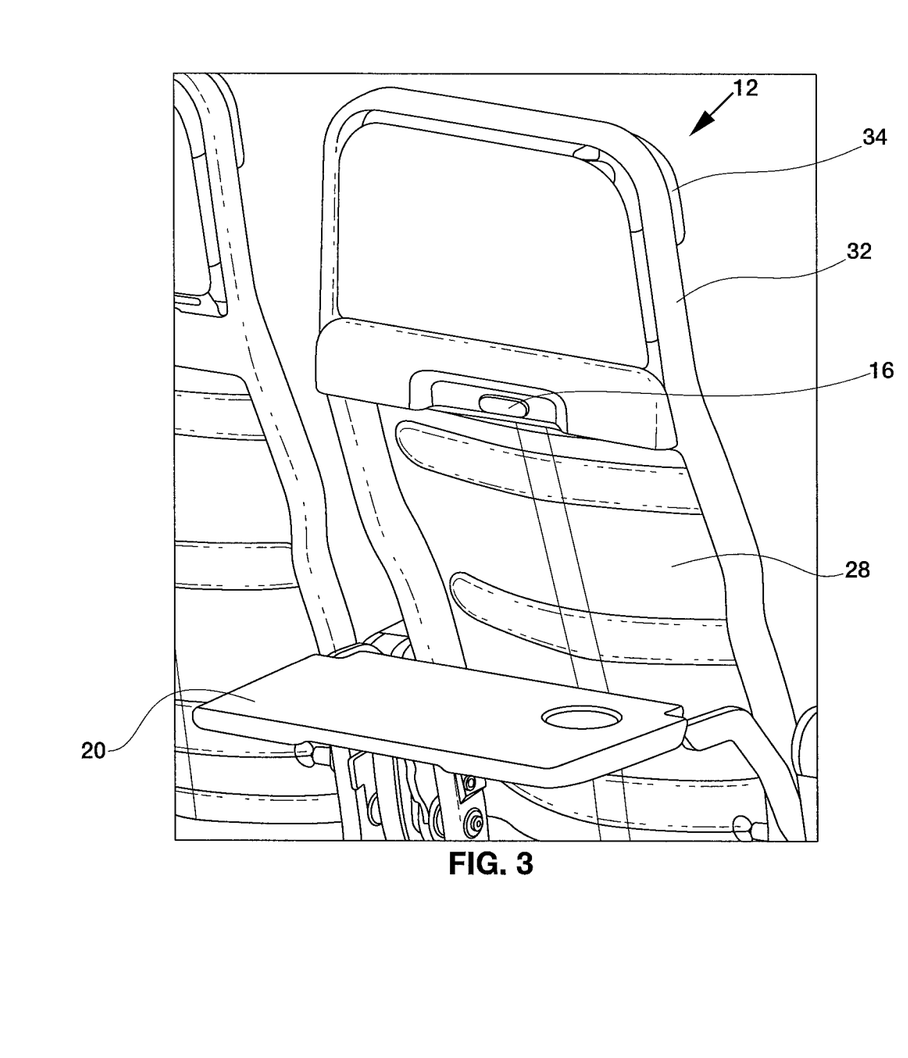
FIG. 3 is an enlarged back elevational view of FIG. 2 with the seat back tray deployed.

As best seen in FIG. 3, the seat back tray table 20 attached to the back of the passenger seat 12 is movable between its first storage position and a second deployed position. A lock mechanism 16 attached to the back of the seat back bezel 14 is adapted to retain the seat back tray table 20 in its secured position. The passenger seat 12 normally has a headrest closeout panel such as shown in FIGS. 2 and 3 but other embodiments may further include a display attached to the back of the passenger seat 12. The display may adjoin the seat back bezel 14. The passenger seat 12 may further include an upholstery package generally designated 32 and may also include a trim package generally designated 34.

Figure 4A:
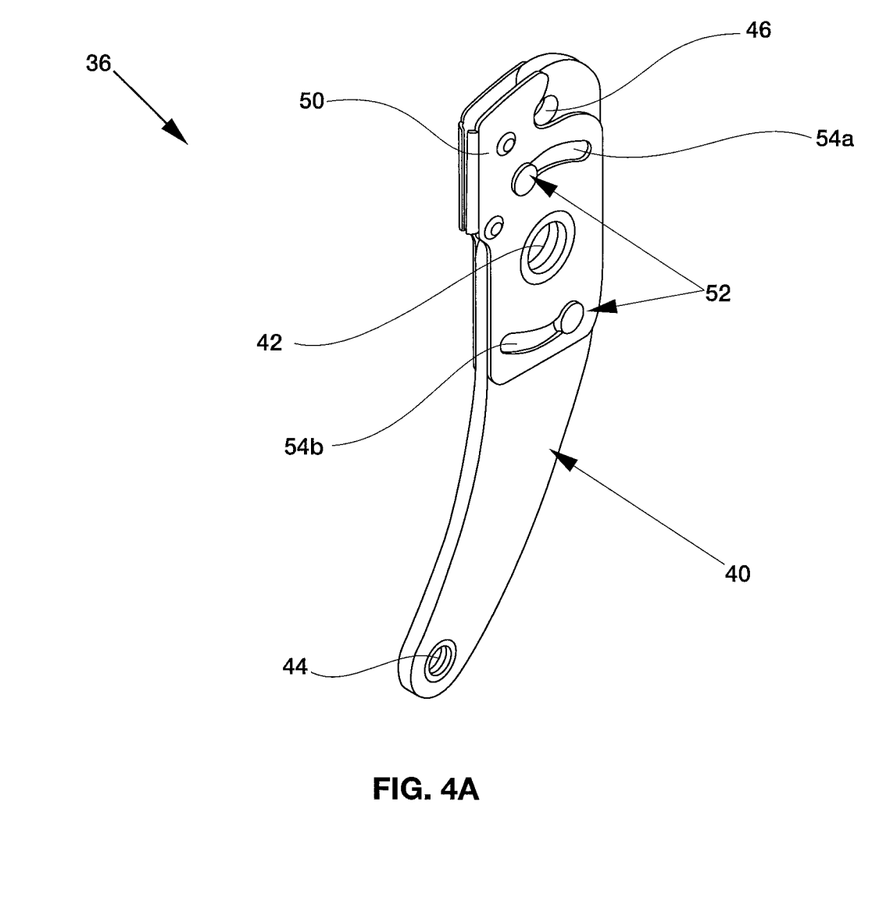
FIG. 4A is an enlarged perspective view of an improved quadrant assembly constructed according to the present inventions.
Figure 4B:
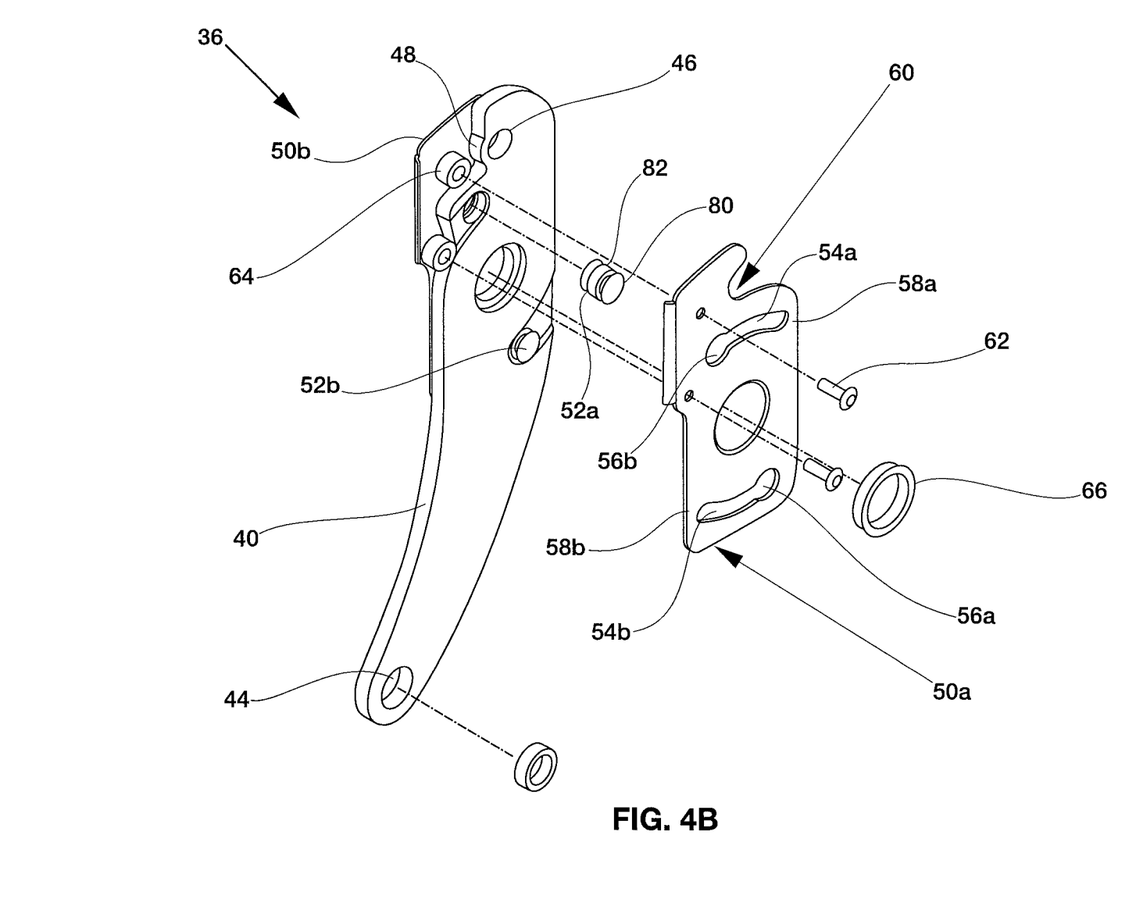
FIG. 4B is an enlarged exploded view of the embodiment shown in FIG. 4A.

FIGS. 4A and 4B illustrate one embodiment of quadrant assembly 36. Quadrant assembly 36 includes a quadrant member 40 having a pivot point 42, a lower attachment point 44 and an upper attachment point 46. Pivot point 42 is adapted to enable backrest 28 to pivot with respect to spreader 29 and quadrant member 36. Lower attachment point 44 attaches to a component of seat bottom support assembly 24, and upper attachment point 46 attaches to backrest 28. Upper attachment point 46 is adapted for preventing the backrest from tilting forward unless a threshold amount of force is applied to backrest 28.

As shown in the embodiment of FIGS. 4A and 4B, upper attachment point 46 includes a mechanical fuse comprising a hole that is adapted to receive a breakout pin. The hole includes a fuse wall 48 that breaks away when a threshold amount of force is met. The term mechanical fuse as used herein generally refers to an assembly capable of tolerating abusive loads up to a certain threshold. One example of a mechanical fuse is described by Blendea (U.S. Pat. No. 7,080,572) and is hereby incorporated by reference in its entirety. In another embodiment, the mechanical fuse of upper attachment point 46 may comprise a slot with a bolt fastened. The threshold amount of force that may the upper attachment point may tolerate is determined by the tightness of the bolt, wherein a bolt that is fastened tighter will exhibit a higher threshold amount of force before the bolt translocates across the slot freely. Yet in alternative embodiments, other variations of mechanical fuses may be employed with upper attachment point 46.

Upper attachment point 46 may also function to retain backrest 28 in a user-desired position and prevent it from undesirably pivoting along spreader 29. In some embodiments, lower attachment point 44 may enable the seat bottom support assembly to articulate as backrest 28 tilts backwards. For example, as backrest 28 and quadrant member 40 rotate backward, the accompanied forward motion of lower attachment point 44 may be utilized to propel a seat bottom forward.

A pivot point brake assembly may be included with quadrant assembly 36 to provide a controlled stop of the rotation of backrest 28 in the event of an impact that causes the backrest to tilt forward. In one embodiment, the pivot point brake assembly includes a pivot point brake plate 50 and a brake pin 52. Pivot point brake plate 50 may be positioned to overlap quadrant member 40 on at least one side of the quadrant member. In the embodiment shown in FIGS. 4A and 4B, pivot point brake assembly 50 overlaps both sides of quadrant member 40.

Quadrant member 40 may include a brake pin 52 adapted for shearing pivot point brake plate 50. As shown in FIG. 4B, brake pin 52 is symmetrical and may be inserted through quadrant member 40 to provide deformation along pivot point brake plates mounted on both sides of quadrant member 40. Pivot point brake plate 40 may include a slot 54 for brake pin 52 to be inserted at position 56. Position 56 has a width to accommodate the head of brake pin 52, while the remaining portion of slot 54 is narrower so that brake pin 52 deforms the pivot point brake plate as it rotates. As shown in the embodiment illustrated in FIG. 4B, pivot point brake plate 50 also includes a recess 60 for rotating the pivot point brake plate 50 when a threshold force is reached and upper attachment point 46 breaks. As upper attachment point 46 breaks, a breakout pin previously held by upper attachment point 46 pushes into recess 60 causing the pivot point brake plate to rotate.

In embodiments where quadrant assembly 36 includes two pivot point brake plates 50*a,b* overlapping quadrant member 40, the two pivot point brake plates 50*a,b* may be fastened to one another via fasteners 62. Fasteners 62 may be inserted into through holes of pivot point brake plate 50*a* and received by pivot point brake plate 50*b* on the opposing side. Pivot point brake plate 50 may also include a pivot point cavity that overlaps with the pivot point 42 of quadrant member 40. Gasket 66 may be added as a seal.

Figure 5:
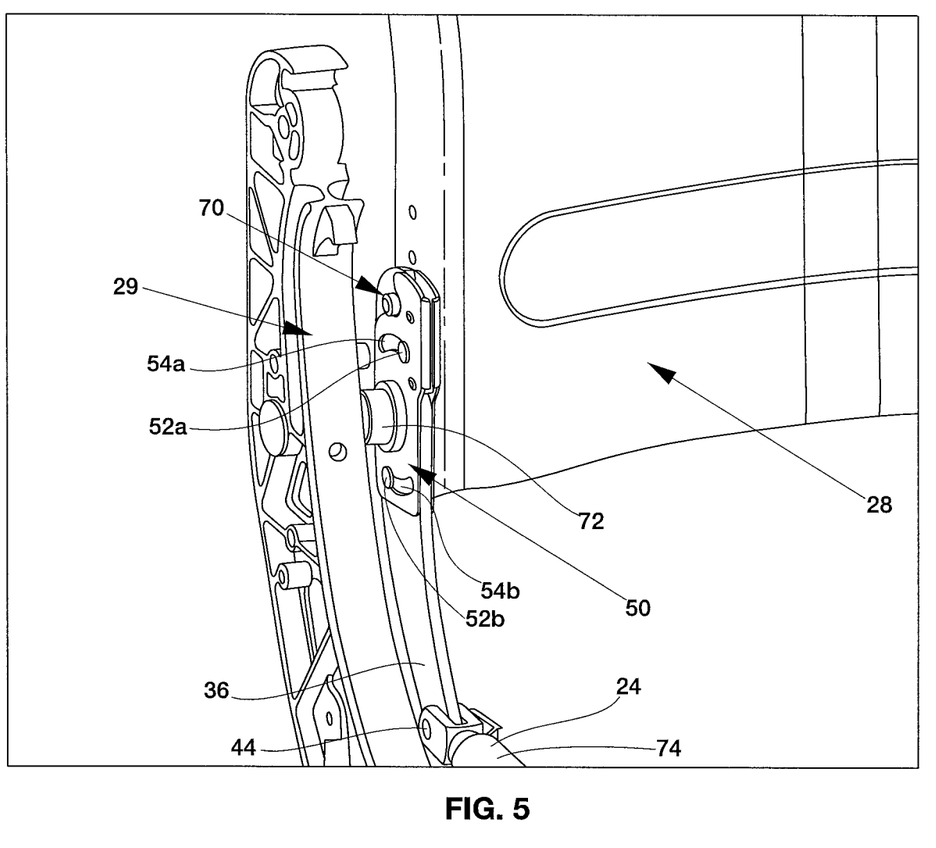
FIG. 5 is an enlarged perspective view of the embodiment shown in FIG. 1 with the backrest in an upright position and the quadrant assembly in a default position.

Turning to FIG. 5, one embodiment of a seat system having a quadrant assembly is shown. FIG. 5 depicts seat system 10 in an upright configuration, wherein both backrest 28 and pivot point brake assembly are in a default position. Backrest 28 includes a breakout pin 70 that is inserted into the upper attachment point 46 of quadrant member 40, and adjacent to recess 60 of pivot point brake plate 50. Backrest 28 also includes a pivot hinge 72 that is inserted through pivot point 44 of quadrant assembly 36 and attached to spreader 29. When a user reclines backrest 28 in this configuration, quadrant assembly 36 rotates accordingly and remains parallel with backrest 28. Spreader 29 remains stationary as backrest 28 and quadrant assembly 36 pivot backward. Likewise, when a user returns backrest 28 from a reclined position to an upright position, spreader 29 remains stationary as backrest 28 and quadrant assembly 36 pivot forward to the upright position.

Lower attachment point 44 is attached to seat bottom support assembly 24. In certain embodiments, lower attachment point 44 may attach to a rigid frame member of seat bottom support assembly 24. In other embodiments, lower attachment point 44 may attach to a linkage to provide mobility to the lower portion of quadrant assembly 36 and enable it to rotate alongside backrest 28. In the embodiments shown in FIGS. 1 and 5, lower attachment point 44 may be attached to a gas spring 74 thereby enabling quadrant assembly 36 to rotate with backrest 28.

In the upright position and as the backrest reclines, the pivot point brake assembly remains substantially coaxial with quadrant member 40. As backrest 28 reclines, quadrant member 40 and pivot point brake plate 50 simultaneously rotate with respect to pivot point 42. As the quadrant assembly rotates, brake pins 52 remain in position 56 within slot 54.

Figure 6:
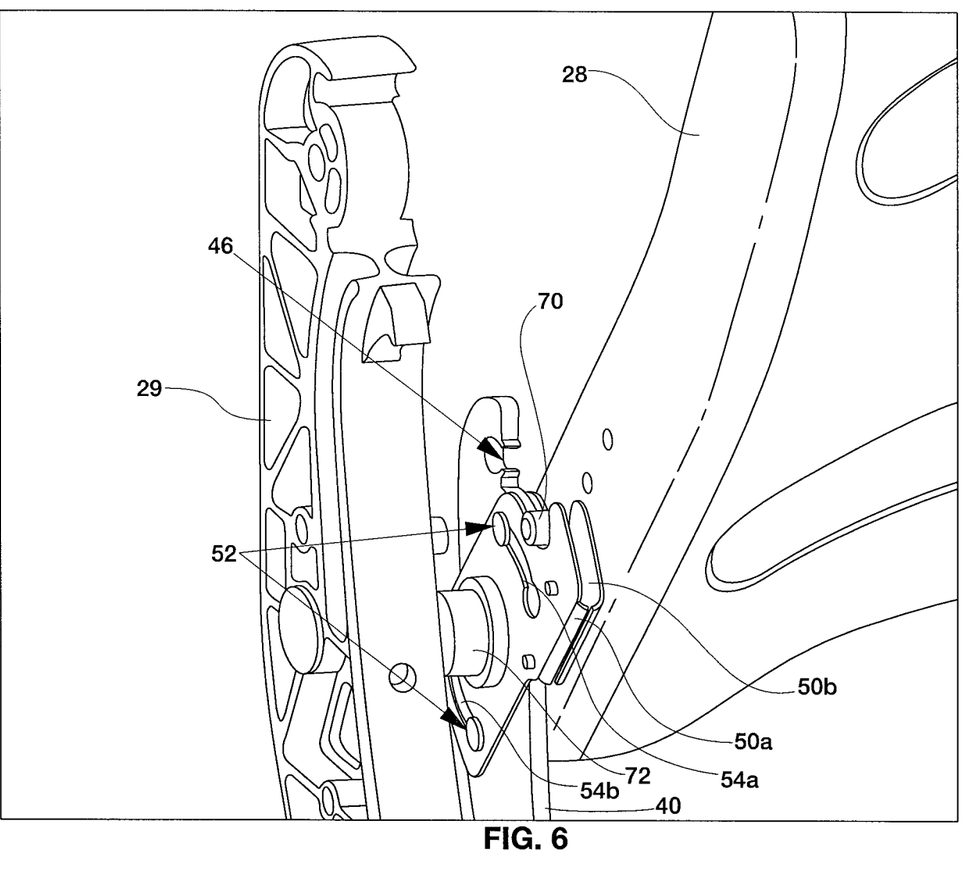
FIG. 6 is an enlarged perspective view of the embodiment shown in FIG. 1 with the backrest and quadrant assembly partially tilted forward.

FIG. 6 illustrates the embodiment of FIG. 5 wherein the backrest is tilted forward because of an impact event. During the event, backrest 28 is forced outside its default and tilted configurations, typically because of a force applied to the back of backrest 28 causing it to move forward. For example, in an aircraft undergoing an emergency landing situation, the impact upon landing may cause passengers to propel forward from their seats and strike the backrest of seats in front of them. There is a need for enabling the backrest to controllably tilt forward to absorb the impact and thereby prevent passengers from serious injury when colliding with the backrest. Otherwise, if the backrest were to remain stationary upon impact by a passenger, the impact could cause the passenger to lose consciousness.

As backrest 28 incurs an impact that causes it to tilt forward, quadrant member 40 remains fixed and can no longer tilt to accompany backrest 28. For example, gas spring 74 may be completely compressed and lower attachment point 44 cannot articulate forward any further. As backrest 28 tilts forward and quadrant member 40 remains fixed, breakout pin 70 begins to push on fuse wall 48 at upper attachment point 46. Once the force applied by breakout pin 70 reaches a threshold amount, fuse wall 48 breaks away and pivot point brake plate 50 catches breakout pin 70 at recess 60. As force continues to be applied, breakout pin 70 rotates pivot point brake plate 50 along pivot point 42. The rate that pivot point brake plate 50 rotates is slowed by brake pin 52, which deforms slot 54 as pivot point brake plate 50 continues to rotate. Brake pin 52 remains fixed to quadrant member 40 while pivot point brake plate 50 continues to pivot. As pivot point brake plate 50 pivots, brake pin 52 shears through slot 54. As best seen in the embodiment of FIG. 4B, brake pin 52 may include a head 80 having a groove 82 adapted to fit the width of slot 54 to help maintain brake pin 52 within slot 54. In some examples, head 80 may be chamfered to facilitate deformation of slot 54 as pivot point brake plate 50 rotates.

It is contemplated that pivot brake assembly may include additional brake pins for increased resistance. FIG. 6 illustrates an embodiment wherein the pivot point brake assembly includes a first brake pin 52a and a second brake pin 52b. As backrest 28 pivots forward, both first brake pin 52a and second brake pin 52b simultaneously deform pivot point brake plate 50 as it rotates with backrest 28. In the embodiment shown, first brake pin 52a is inserted into a first slot 54a and second brake pin 52b is inserted into a second slot 54b, wherein first slot 54a located above second slot 54b. As seen in FIG. 6, first brake pin 52a and second brake pin 52b may be opposed with respect to pivot point 42.

Figure 7:
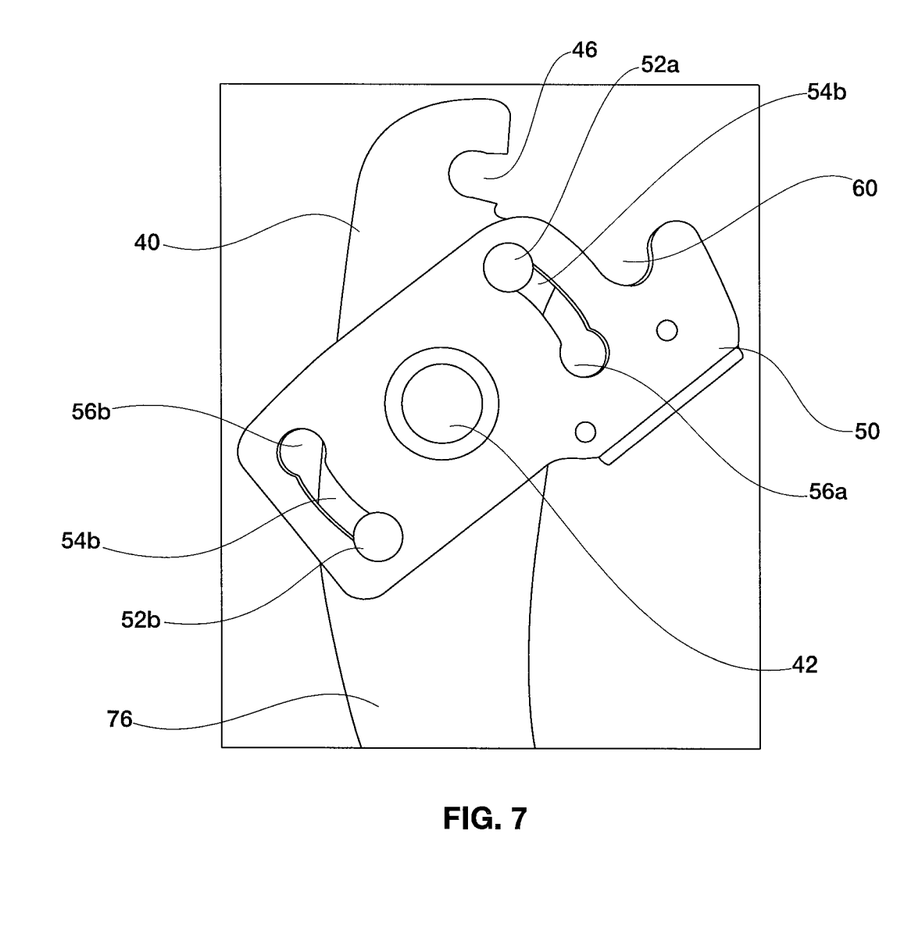
FIG. 7 is an enlarged front elevational view of an embodiment of the quadrant assembly with the breakout pin detached from the upper attachment point and the pivot point brake sheared by pivot pins.

FIG. 7 provides a close-up view of a quadrant assembly after an impact event. Upper attachment point 46 no longer includes a fuse wall. Pivot point brake plate 50 is oriented at an angle with respect to quadrant member 40, wherein the number of degrees of the angle is dependent upon the force applied to the back of backrest 28. In the embodiment shown, the maximum possible degrees that pivot point brake plate 50 may be angled is determined by stop wall 58 (see FIG. 4B). Slot 54 becomes deformed as pivot point brake plate 50 rotates and head 80 of brake pin 52 shears through the narrower channel of slot 54. Once brake pin 52 reaches stop wall 58, pivot point brake plate 50 cannot rotate any further and deformation of slot 54 ceases. In one embodiment, stop wall 58 is located at an opposing end from position 56 in slot 54.

In operation, quadrant assembly 36 is adapted to be quickly modified based on desired thresholds. For example, all aircraft seats must undergo numerous regulation tests before government approval. The head injury criterion (HIC) test represents one crash test wherein a score less than 1000 is required to pass. A failed HIC test requires the seat components to be modified until a positive result is obtained. Using the quadrant assembly disclosed herein, these modifications can be quickly and predictably performed.

There are two stages that may occur during the event of an impact. During the initial impact, the threshold force required to move the backrest forward is determined by the upper attachment point of quadrant member 36. Referring to embodiment shown in FIGS. 5 and 6, the upper attachment point 46 includes a hole having a fuse wall 48 adapted to receive a breakout pin 70. Fuse wall 48 may be modified to increase or decrease the threshold amount of force required for it to break. The thickness of the cross-section of fuse wall 48 may vary to accommodate various loads; for instance, between about 100 pounds and 300 pounds. In one example shown in FIG. 7, the quadrant member may be comprised of an aluminum alloy having its longitudinal grain direction 76 substantially oriented in a pre-determined direction, such as along the length of the quadrant member thereby reducing the variation in breaking strength of the quadrant member. The force threshold may be increased by an additional 10 pounds of force for every $\frac{1}{8000}^{th}$ of an inch added to the thickness of the cross-section of fuse wall 48. Thus, in one embodiment, the load for breakout pin 70 to break away from upper attachment point 46 is about 200 pounds, wherein the thickness of the cross-section of fuse 48 wall is about ⅙ inches. These numbers may further vary depending on the grain direction 76.

Once breakout pin 70 detaches from upper attachment point 46, the second stage involves the pivot point brake assembly limiting the speed of rotation for backrest 28. After the initial impact, breakout pin 70 inserts into recess 60 causing pivot point brake plate 50 to rotate along with backrest 28. For example, the pivot point brake assembly may be comprised of sheet metal, wherein brake pin 52 may resist a force up to about 300 pounds before it deforms through slot 54 of pivot point brake plate 50.

The rate at which both components rotate may be modified by several variables. For instance, as the thickness of pivot point brake plate 50 increases, the more metal that brake pin 52 must deform for pivot point brake plate 50 to rotate further. Similarly, narrowing the width of slot 54 provides additional material that brake pin 52 must deform for pivot point brake plate 50 to rotate. Also, adding additional brake pins and slots causes more force to be applied to backrest 28 for pivot point brake plate 50 to rotate. Including an additional quadrant assembly is yet another method to increase the amount of force necessary to rotate backrest 28 and pivot point brake plate 50 forward; for example, a second quadrant assembly attached to a second spreader located on an opposing side of passenger seat frame 12. When pivot point brake plate 50 ceases to rotate, backrest 28 will also cease to rotate since breakout pin 70 becomes restrained by recess 60.

Certain modifications and improvements will occur to those skilled in the art upon a reading of the foregoing description. By way of example, the pivot point brake assembly disclosed herein may be used in combination with other quadrant assemblies known in the art. Also, constructions of the quadrant member and pivot point brake assembly are not limited to the materials disclosed herein. It should be understood that all such modifications and improvements have been deleted herein for the sake of conciseness and readability but are properly within the scope of the following claims.

I claim:

1. In a seat system for a passenger aircraft wherein the seat system includes a passenger seat frame having (i) a backrest support assembly including a backrest and a spreader and (ii) a seat bottom support assembly, the improvement comprising a quadrant assembly, said quadrant assembly comprising:
   (a) a quadrant member connected between said backrest support assembly and said seat bottom support assembly, said quadrant member including
      (i) a pivot point adapted to pivot said backrest with respect to said spreader and said quadrant member
      (ii) a lower attachment point attached to said seat bottom support assembly and
      (iii) an upper attachment point attached to said backrest and adapted to break away in the event of an impact with said seat back, said upper attachment point further including a mechanical fuse located at said upper attachment point; and
   (b) a pivot point brake assembly attached to said pivot point and adapted to provide a controlled stop of the rotation of said backrest about said pivot point in the event of an impact with said backrest, wherein said pivot point brake assembly includes a brake pin and a pivot point brake plate, wherein said brake pin is inserted through a hole in said quadrant member and through an opening in said pivot point brake plate.

2. The quadrant assembly according to claim 1 further including a second quadrant assembly attached to said backrest support assembly and said seat bottom support assembly.

3. The quadrant assembly of claim 2, wherein the second quadrant assembly is attached to a second spreader located on an opposing side of said passenger seat frame.

4. The quadrant assembly according to claim 1, wherein said quadrant member is comprised of an aluminum alloy having its longitudinal grain direction substantially oriented in a pre-determined direction, such as along the length of said quadrant member thereby reducing the variation in breaking strength of said quadrant member.

5. The quadrant assembly according to claim 1, wherein said mechanical fuse comprises a breakout pin inserted into a hole along said upper attachment point.

6. The quadrant assembly according to claim 5, wherein the load to set said mechanical fuse is dependent on the thickness of the cross-section of a fuse wall located adjacent to said hole.

7. The quadrant assembly according to claim 6, wherein the load for said breakout pin to break away from said upper attachment point is between about 100 pounds and 300 pounds.

8. The quadrant assembly according to claim 7, wherein the load for said breakout pin to break away from said upper attachment point is about 200 pounds and the thickness of the cross-section of said fuse wall is about ⅙ inches.

9. The quadrant assembly according to claim 1, wherein said pivot point brake plate overlaps at least one side of said quadrant member.

10. The quadrant assembly according to claim 9, wherein the opening in said pivot point brake plate that said brake pin is inserted into is a slot in said pivot point brake plate overlapping said hole in said quadrant member.

11. The quadrant assembly according to claim 10, wherein said slot of pivot point brake plate further includes a stop wall at an opposing.

12. The quadrant assembly according to claim 10, wherein said brake pin and said slot in said pivot point brake plate are adapted to provide a controlled stop of the rotation of said backrest about said pivot point after said impact causes said upper attachment point of said quadrant member to break away.

13. The quadrant assembly according to claim 12, wherein said brake pin provides a controlled stop by deforming through said slot of said pivot point brake plate overlapping said hole.

14. The quadrant assembly according to claim 13, wherein the controlled stop of the rotation of said backrest about said pivot point is controlled by the thickness of said pivot point brake plate.

15. The quadrant assembly according to claim 13, wherein the controlled stop of the rotation of said backrest about said pivot point is controlled by the width of said slot in said pivot point brake plate.

16. The quadrant assembly according to claim 13, wherein said pivot point brake assembly resists force up to about 300 pounds before said brake pin deforms through said slot of said pivot point brake plate.

17. The quadrant assembly according to claim 1, wherein said brake pin includes a head having a groove adapted to fit the width of said slot of said pivot point brake plate to maintain the position of said brake pin in said slot.

18. The quadrant assembly according to claim 17, wherein said groove in the head of said brake pin is chamfered.

19. The quadrant assembly according to claim 1, wherein said pivot point brake assembly comprises a first brake pin and a second brake pin.

20. The quadrant assembly according to claim 19, wherein said second brake pin simultaneously resists an applied force with said first brake pin.

21. The quadrant assembly according to claim 19, wherein said first brake pin is inserted into a first slot on said pivot point brake plate and said second brake pin is inserted into a second slot on said pivot point brake plate.

22. The quadrant assembly according to claim 21, wherein said first slot is located above said second slot.

23. The quadrant assembly according to claim 22, wherein said first brake pin and said second brake pin are opposed with respect to said pivot point.

24. A seat system for a passenger aircraft, said seat system comprising:
(a) a passenger seat frame having
(i) a backrest support assembly including a backrest and a spreader and
(ii) a seat bottom support assembly;
(b) a quadrant assembly comprising a quadrant member connected between said backrest support assembly and said seat bottom support assembly, said quadrant member including
(i) a pivot point adapted to pivot said backrest with respect to said spreader and said quadrant member, a lower attachment point attached to said seat bottom support assembly and
an upper attachment point attached to said backrest and adapted to break away in the event of an impact with said backrest, said upper attachment point further including a mechanical fuse located at said upper attachment point; and
(ii) a pivot point brake assembly attached to said pivot point and adapted to provide a controlled stop of the rotation of said backrest about said pivot point in the event of an impact with said backrest, wherein said pivot point brake assembly includes a brake pin and a pivot point brake plate, wherein said brake pin is inserted through a hole in said quadrant member and through an opening in said pivot point brake plate; and
(c) a seat back tray table attached to the back of said passenger seat frame.

25. The seat system according to claim 24, wherein said seat back tray table attached to the back of said passenger seat frame is movable between a first storage position and a second deployed position.

26. The seat system according to claim 25 further including a lock mechanism attached to the back of said passenger seat frame for retaining said seat back tray table in a secured position.

27. The seat system according to claim 24 further including a display attached to the back of said passenger seat frame.

28. The seat system according to claim 27, wherein said display is adjoined by the back of said passenger seat frame.

29. The seat system according to claim 24 further including a backrest cushion attached to the backrest support assembly.

30. The seat system according to claim 29, wherein said backrest support assembly further includes a headrest.

31. The seat system according to claim 30, wherein said headrest is adjustable to accommodate for the height of a passenger.

32. The seat system according to claim 24, wherein said passenger seat frame further includes an upholstered package.

33. The seat system according to claim 32, wherein said passenger seat further includes a trim package.

34. The quadrant assembly according to claim 24 further including a second quadrant assembly attached to said backrest support assembly and said seat bottom support assembly.

35. The quadrant assembly of claim 34, wherein the second quadrant assembly is attached to a second spreader located on an opposing side of said passenger seat frame.

36. The quadrant assembly according to claim 24, wherein said quadrant member is comprised of an aluminum alloy having its longitudinal grain direction substantially oriented in a pre-determined direction, such as along the length of said quadrant member thereby reducing the variation in breaking strength of said quadrant member.

37. The quadrant assembly according to claim 24, wherein said mechanical fuse comprises a breakout pin inserted into a hole along said upper attachment point.

38. The quadrant assembly according to claim 37, wherein the load to set said mechanical fuse is dependent on the thickness of the cross-section of a fuse wall located adjacent to said hole.

39. The quadrant assembly according to claim 38, wherein the load for said breakout pin to break away from said upper attachment point is between about 100 pounds and 300 pounds.

40. The quadrant assembly according to claim 39, wherein the load for said breakout pin to break away from said upper attachment point is about 200 pounds and the thickness of the cross-section of said fuse wall is about 1/6 inches.

41. The quadrant assembly according to claim 1, wherein said pivot point brake plate overlaps at least one side of said quadrant member.

42. The quadrant assembly according to claim 41, wherein the opening in said pivot point brake plate that said brake pin is inserted into is a slot in said pivot point brake plate overlapping said hole in said quadrant member.

43. The quadrant assembly according to claim 42, wherein said slot of pivot point brake plate further includes a stop wall at an opposing end.

44. The quadrant assembly according to claim 42, wherein said brake pin and said slot in said pivot point brake plate are adapted to provide a controlled stop of the rotation of said backrest about said pivot point after said impact causes said upper attachment point of said quadrant member to break away.

45. The quadrant assembly according to claim 44, wherein said brake pin provides a controlled stop by deforming through said slot of said pivot point brake plate overlapping said hole.

46. The quadrant assembly according to claim 45, wherein the controlled stop of the rotation of said backrest about said pivot point is controlled by the thickness of said pivot point brake plate.

47. The quadrant assembly according to claim 45, wherein the controlled stop of the rotation of said backrest about said pivot point is controlled by the width of said slot in said pivot point brake plate.

48. The quadrant assembly according to claim 45, wherein said pivot point brake assembly resists force up to about 300 pounds before said brake pin deforms through said slot of said pivot point brake plate.

49. The quadrant assembly according to claim 1, wherein said brake pin includes a head having a groove adapted to fit the width of said slot of said pivot point brake plate to maintain the position of said brake pin in said slot.

50. The quadrant assembly according to claim 49, wherein said groove in the head of said brake pin is chamfered.

51. The quadrant assembly according to claim 1, wherein said pivot point brake assembly comprises a first brake pin and a second brake pin.

52. The quadrant assembly according to claim 51, wherein said second brake pin simultaneously resists an applied force with said first brake pin.

53. The quadrant assembly according to claim 51, wherein said first brake pin is inserted into a first slot on said pivot point brake plate and said second brake pin is inserted into a second slot on said pivot point brake plate.

54. The quadrant assembly according to claim 53, wherein said first slot is located above said second slot.

55. The quadrant assembly according to claim 54, wherein said first brake pin and said second brake pin are opposed with respect to said pivot point.

* * * * *

UNITED STATES PATENT AND TRADEMARK OFFICE
CERTIFICATE OF CORRECTION

PATENT NO. : 10,967,975 B2  
APPLICATION NO. : 16/309383  
DATED : April 6, 2021  
INVENTOR(S) : Mitchell R. Rife Page 1 of 1

It is certified that error appears in the above-identified patent and that said Letters Patent is hereby corrected as shown below:

In the Claims

- In Column 11, Line 43, --The quadrant assembly according to claim 1-- should read "The quadrant assembly according to claim 24"

- In Column 12, Line 27, --The quadrant assembly according to claim 1-- should read "The quadrant assembly according to claim 24"

- In Column 12, Line 34, --The quadrant assembly according to claim 1-- should read "The quadrant assembly according to claim 24"

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*